United States Patent
Lee et al.

(10) Patent No.: US 10,886,568 B2
(45) Date of Patent: Jan. 5, 2021

(54) ELECTROLYTE FOR RECHARGEABLE LITHIUM BATTERY AND RECHARGEABLE LITHIUM BATTERY

(71) Applicant: SAMSUNG SDI CO., LTD., Yongin-si (KR)

(72) Inventors: Harim Lee, Yongin-si (KR); Hyejin Park, Yongin-si (KR); Myungheui Woo, Yongin-si (KR); Jin-Hyeok Lim, Yongin-si (KR); Hyunbong Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 76 days.

(21) Appl. No.: 16/385,923

(22) Filed: Apr. 16, 2019

(65) Prior Publication Data

US 2019/0326636 A1 Oct. 24, 2019

(30) Foreign Application Priority Data

Apr. 19, 2018 (KR) .................. 10-2018-0045645

(51) Int. Cl.
*H01M 10/0567* (2010.01)
*H01M 10/0525* (2010.01)
*H01M 10/0569* (2010.01)

(52) U.S. Cl.
CPC ... *H01M 10/0567* (2013.01); *H01M 10/0525* (2013.01); *H01M 10/0569* (2013.01); *H01M 2300/0025* (2013.01)

(58) Field of Classification Search
CPC ......... H01M 10/0525; H01M 10/0567; H01M 10/0569; H01M 2300/0025
See application file for complete search history.

(56) References Cited

U.S. PATENT DOCUMENTS

| | | |
|---|---|---|
| 2006/0035137 A1 | 2/2006 | Maruo et al. |
| 2010/0003597 A1 | 1/2010 | Tsunashima et al. |
| 2014/0377686 A1 | 12/2014 | Izuhara et al. |
| 2019/0252724 A1 | 8/2019 | Shatunov et al. |

FOREIGN PATENT DOCUMENTS

| | | |
|---|---|---|
| KR | 10-2005-0056994 A | 6/2005 |
| KR | 10-2009-0052870 A | 5/2009 |
| KR | 10-2014-0105462 A | 9/2014 |
| KR | 10-2018-0036340 A | 4/2018 |
| WO | WO 2018/062719 A1 | 4/2018 |

OTHER PUBLICATIONS

Extended European Search Report for corresponding European Patent Application No. 19169746.5, dated Aug. 2, 2019, 6 pages.
Lermontov, Sergei A., et al.; 2-Hydroperfluoropropyl Azide-a Versatile Reagent for the Oxidative Fluorination of Organic Compounds of Trivalent Phosphorus, Heteroatom Chemistry, vol. 4, No. 6, Dec. 1, 1993, VCH Publishers, 7 pages.

*Primary Examiner* — Carlos Barcena
(74) *Attorney, Agent, or Firm* — Lewis Roca Rothgerber Christie LLP

(57) ABSTRACT

Aspects of embodiments of the present disclosure provide an electrolyte for a rechargeable lithium battery including a non-aqueous organic solvent, a lithium salt, and an additive, wherein the additive is a compound represented by Chemical Formula 1:

Chemical Formula 1

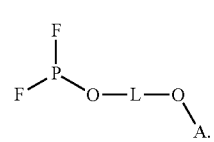

The compound represented by Chemical Formula 1 and/or its oxide may participate in one or more electrochemical reactions to form a robust solid electrolyte interphase (SEI) film, and may also improve the stability of other electrolyte components against oxidative decomposition.

17 Claims, 6 Drawing Sheets

ELECTROLYTE FOR RECHARGEABLE LITHIUM BATTERY AND RECHARGEABLE LITHIUM BATTERY

CROSS-REFERENCE TO RELATED APPLICATION

This application claims priority to and the benefit of Korean Patent Application No. 10-2018-0045645, filed in the Korean Intellectual Property Office on Apr. 19, 2018, the entire content of which is incorporated herein by reference.

BACKGROUND

1. Field

One or more aspects of example embodiments of the present disclosure are related to an electrolyte for a rechargeable lithium battery, and a rechargeable lithium battery including the same.

2. Description of the Related Art

A rechargeable lithium battery may be recharged and may have an energy density per unit weight of at least three times that of conventional batteries (such as lead batteries, nickel-cadmium batteries, nickel hydrogen (e.g., nickel metal hydride) batteries, nickel zinc batteries and/or the like). It may be also charged and/or discharged at a high rate, and is commercially manufactured for laptops, cell phones, electric tools, electric bikes, and/or the like. Additional improvements in the energy density of such rechargeable lithium batteries are an active topic of research.

A rechargeable lithium battery may be manufactured by injecting an electrolyte into a battery cell, which includes a positive electrode including a positive active material capable of intercalating/deintercalating lithium ions, and a negative electrode including a negative active material capable of intercalating/deintercalating lithium ions.

The electrolyte may include an organic solvent in which a lithium salt is dissolved, and the electrolyte may critically determine or affect the stability and performance of the rechargeable lithium battery.

$LiPF_6$, which is commonly used as a lithium salt in electrolytes, has a problem of reacting with the electrolyte solvent to thereby result in depletion of the solvent and generation of a large amount of gas. $LiPF_6$ may decompose to generate LiF and $PF_5$, leading to electrolyte depletion in the battery, resulting in degraded high temperature performance and poor safety.

Thus, the performance of lithium batteries in the related art have been limited by the lack of an electrolyte that suppresses side reactions of the lithium salt.

SUMMARY

One or more aspects of example embodiments of the present disclosure are directed toward an electrolyte for a rechargeable lithium battery that is capable of ensuring high-temperature stability, thereby improving battery performance.

One or more aspects of example embodiments of the present disclosure are directed toward a rechargeable lithium battery including the electrolyte for a rechargeable lithium battery.

One or more example embodiments of the present disclosure provide an electrolyte for a rechargeable lithium battery including: a non-aqueous organic solvent, a lithium salt, and an additive, wherein the additive includes a compound represented by Chemical Formula 1:

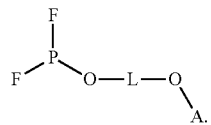

Chemical Formula 1

In Chemical Formula 1,

A may be a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C3 to C30 cycloalkynyl group, or a substituted or unsubstituted C6 to C30 aryl group, L may be a substituted or unsubstituted C1 to C20 alkylene group, or $C_n(R^1)_{2n}$—O—$C_m(R^2)_{2m}$, $R^1$ and $R^2$ may each independently be hydrogen, a substituted or unsubstituted C1 to C10 alkyl group, or a substituted or unsubstituted C3 to C10 cycloalkyl group, and n and m may each independently be an integer of 1 to 10.

In some embodiments, L of Chemical Formula 1 may be a substituted or unsubstituted C2 to C20 alkylene group, or $C_n(R^1)_{2n}$—O—$C_m(R^2)_{2m}$, $R^1$ and $R^2$ may each independently be hydrogen, a substituted or unsubstituted C1 to C10 alkyl group, or a substituted or unsubstituted C3 to C10 cycloalkyl group, and n and m may each independently be an integer of 2 to 10.

In some embodiments, the compound represented by Chemical Formula 1 may be further represented by Chemical Formula 1A:

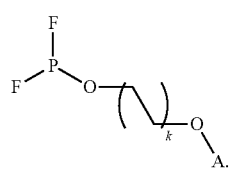

Chemical Formula 1A

In Chemical Formula 1A,

A may be a substituted or unsubstituted C1 to C30 alkyl group, and k may be an integer of 1 to 5.

In some embodiments, the compound represented by Chemical Formula 1A may be further represented by Chemical Formula A:

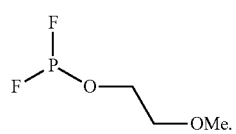

Chemical Formula A

In some embodiments, the compound represented by Chemical Formula 1 may be included in an amount of about 0.001 wt % to about 5 wt % based on a total amount of the electrolyte for a rechargeable lithium battery.

In some embodiments, the additive may further include at least one additional additive selected from vinylethylene carbonate (VEC), fluoroethylene carbonate (FEC), propene sultone (PST), propane sultone (PS), lithium tetrafluoroborate (LiBF$_4$), lithium bis(oxalato)borate (LiBOB), succinonitrile (SN), and combinations thereof.

In some embodiments, the additional additive may be included in an amount of about 0.1 wt % to about 5 wt % based on a total amount of the electrolyte for a rechargeable lithium battery.

One or more example embodiments of the present disclosure provide a rechargeable lithium battery including a positive electrode; a negative electrode; and the electrolyte, wherein the electrolyte is between the positive electrode and the negative electrode.

The rechargeable lithium battery including the electrolyte may realize improved high-temperature stability and/or improved cycle-life characteristics.

In some embodiments, the rechargeable lithium battery may further include a solid electrolyte interphase (SEI) film on a surface of the negative electrode between the negative electrode and the electrolyte, wherein the SEI film includes the compound represented by Chemical Formula 1.

In some embodiments, the solid electrolyte interphase (SEI) film may further include an oxide of the compound represented by Chemical Formula 1.

In some embodiments, the compound represented by Chemical Formula 1 may be decomposed into a difluorophosphite group (—OPF$_2$) and an oxide, and the difluorophosphite group may be bound to a surface of the positive electrode.

DETAILED DESCRIPTION

Figure 1:
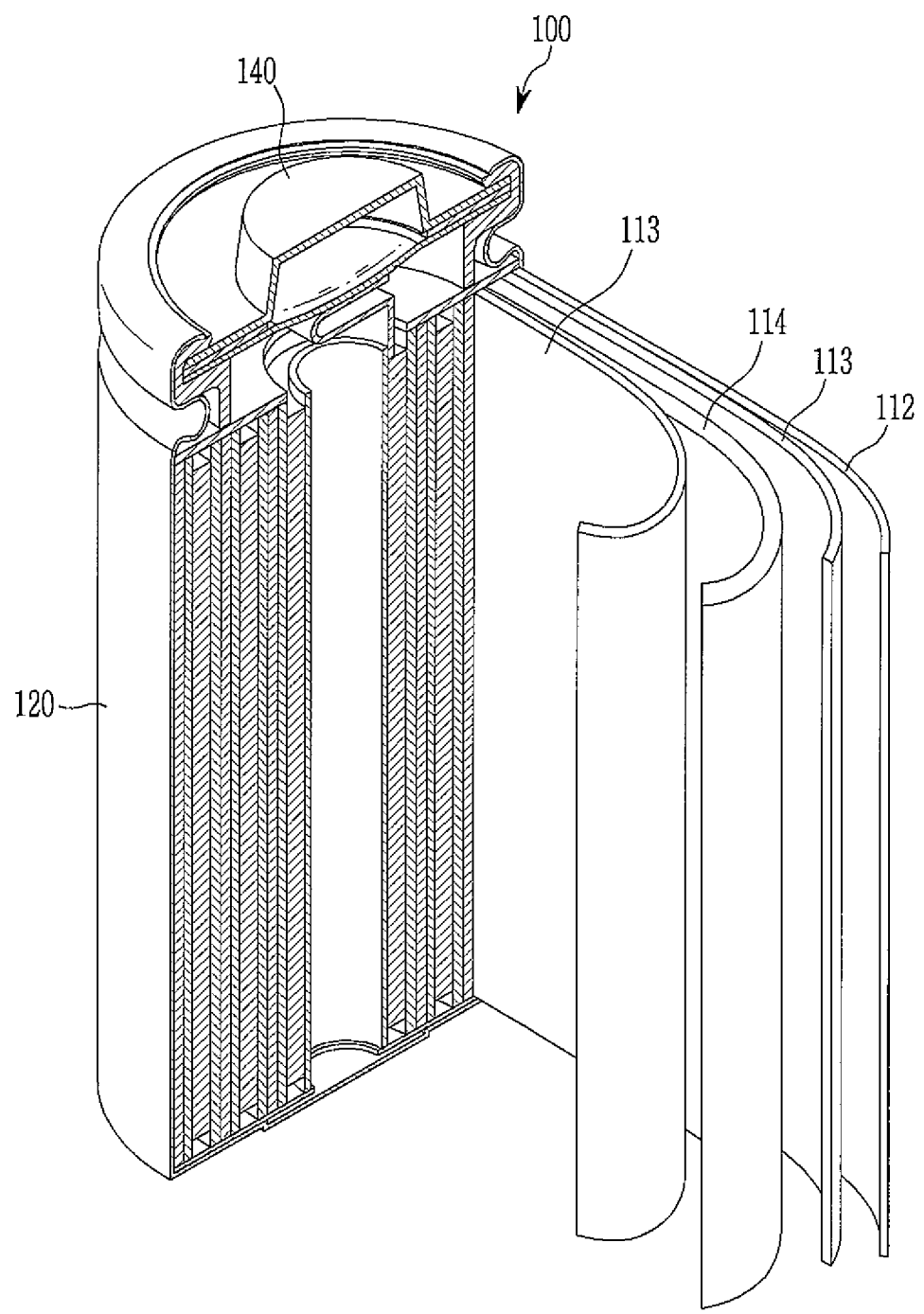
FIG. 1 is a schematic view showing a rechargeable lithium battery according to an embodiment of the present disclosure.

Hereinafter, example embodiments of the present disclosure will be described and illustrated in more detail with reference to the accompanying drawings. However, these embodiments are examples that do not limit the present disclosure, which is defined by the scope of claims. As those skilled in the art would realize, the described embodiments may be modified in various suitable ways, all without departing from the spirit or scope of the present disclosure.

In the drawings, the thicknesses of layers, films, panels, regions, etc., may be exaggerated for clarity. Like reference numerals designate like elements throughout the specification, and duplicative descriptions thereof may not be provided. It will be understood that when an element such as a layer, film, region, or substrate is referred to as being "on" another element, it can be directly on the other element, or intervening element(s) may also be present. In contrast, when an element is referred to as being "directly on" another element, no intervening elements are present.

Expressions such as "at least one of", "one of", "selected from", "at least one selected from", and "one selected from", when preceding a list of elements, modify the entire list of elements and do not modify the individual elements of the list. Further, the use of "may" when describing embodiments of the present disclosure refers to "one or more embodiments of the present disclosure."

As used herein, when a definition is not otherwise provided, the term 'substituted' refers to replacement of a hydrogen atom (e.g., one or more hydrogen atoms) in a compound with a substituent selected from, for example, a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl acid group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and combinations thereof.

Hereinafter, an electrolyte for a rechargeable lithium battery according to an embodiment of the present disclosure is described in more detail.

An electrolyte for a rechargeable lithium battery according to an embodiment of the present disclosure includes a non-aqueous organic solvent, a lithium salt, and an additive, wherein the additive includes a compound represented by Chemical Formula 1:

Chemical Formula 1

In Chemical Formula 1,

A may be a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C3 to C30 cycloalkynyl group, or a substituted or unsubstituted C6 to C30 aryl group, L may be a substituted or unsubstituted C1 to C20 alkylene group, or $C_n(R^1)_{2n}$—O—$C_m(R^2)_{2m}$, $R^1$ and $R^2$ may each independently be hydrogen, a substituted or unsubstituted C1 to C10 alkyl group, or a substituted or unsubstituted C3 to C10 cycloalkyl group, and n and m may each independently be an integer of 1 to 10.

When an electrolyte including LiPF$_6$ as the lithium salt is exposed to a high temperature (e.g., operating or storage temperatures above 25° C., for example, 40° C. to 100° C.), and for example, in the presence of a small amount of water, the LiPF$_6$ may decompose into LiF and PF$_5$, and these decomposition products may react with the organic solvent in the electrolyte to consume the organic solvent, and may also react with the positive electrode to elute metal ions. Therefore, the high-temperature stability and/or cycle-life characteristics of the lithium battery may be deteriorated.

According to embodiments of the present disclosure, when the additive including the compound represented by Formula 1 is included in the electrolyte, a robust SEI (solid electrolyte interface or solid electrolyte interphase) film having excellent ion conductivity may be formed on the surface of a negative electrode, and may thereby suppress or reduce decomposition of the surface of the negative electrode during high-temperature cycling and operation, and may prevent or reduce one or more oxidation reactions of the electrolyte.

For example, the compound represented by Chemical Formula 1 may coordinate with a pyrolyzed (e.g., decomposition) product of a lithium salt such as $LiPF_6$ or with anions dissociated from the lithium salt to thereby form a complex, and the complex may stabilize the pyrolyzed product of a lithium salt such as $LiPF_6$ or the anions dissociated from the lithium salt. The compound represented by Chemical Formula 1 may thereby suppress or reduce one or more undesired side reactions of the pyrolyzed product and/or anions with the electrolyte and prevent or reduce gas generation inside a rechargeable lithium battery, thereby reducing (greatly reducing) defect rates and improving the cycle-life characteristics of the rechargeable lithium battery.

In addition, since the side reaction with the electrolyte is suppressed, a SEI film and/or protective layer having a low resistance may be formed (e.g., on the anode), and accordingly, an increase in battery internal resistance may be reduced. For example, the SEI film may include the compound represented by Chemical Formula 1, for example, in the form of one or more reaction products thereof.

In addition, the compound represented by Chemical Formula 1 and/or its oxide may participate in one or more electrochemical reactions with the components of the SEI film to make the film more robust, and may also improve the stability of other components included in the electrolyte against oxidative decomposition.

In some embodiments, the compound represented by Chemical Formula 1 may be decomposed into a difluorophosphite group ($-OPF_2$) and an oxide fragment (e.g., an oxide).

The difluorophosphite group ($-OPF_2$) and the oxide fragment have excellent or suitable electrical and chemical reactivity, and may thus form a donor-acceptor bond with a transition metal oxide moiety exposed at the surface of a positive active material to thereby form a protective layer on the positive electrode in a form of a complex, and may thereby suppress elution of metal ions.

In addition, the difluorophosphite group ($-OPF_2$) adhered (bound) to the transition metal oxide during initial charging of the rechargeable lithium battery may be oxidized into a plurality of fluorophosphate groups and may resultantly form an inactive (e.g., inert) layer having increased stability at the positive electrode and excellent ion conductivity. For example, one or more fluorophosphate groups may be adhered (bound) to the transition metal oxide and/or included in the inactive layer at the positive electrode. Accordingly, oxidization of other components of the electrolyte may be prevented or reduced. As a result, cycle-life performance of the rechargeable lithium battery may be improved, and simultaneously (or concurrently), swelling of the rechargeable lithium battery may be prevented or reduced.

For example, the difluorophosphite group, which is substituted with fluoro groups, maintains an appropriate or suitable reactivity and thus prevents or protects against decomposition side reactions of water and/or the electrolyte to generate undesired byproducts, and may therefore be used as an appropriate or suitable additive in the electrolyte.

In some embodiments, L of Chemical Formula 1 may be a substituted or unsubstituted C2 to C20 alkylene group or $C_n(R^1)_{2n}$—O—$C_m(R^2)_{2m}$, $R^1$ and $R^2$ may each independently be hydrogen, a substituted or unsubstituted C1 to C10 alkyl group, or a substituted or unsubstituted C3 to C10 cycloalkyl group, and n and m may each independently be an integer of 2 to 10.

When $R^1$ is 2 or more, each $R^1$ may be the same or different from each other.

In addition, when $R^2$ is 2 or more, each $R^2$ may be the same or different from each other.

The compound represented by Chemical Formula 1: 1) has a structure including an ethylene group or a diethylene ether group as a minimum unit in L, 2) is reduction-decomposed in the electrolyte to form an SEI film to stabilize an electrode-electrolyte interface, and (3), may therefore further improve an effect of suppressing additional decomposition reactions of the electrolyte.

In some embodiments, for example, the compound represented by Chemical Formula 1 may be further represented by Chemical Formula 1A:

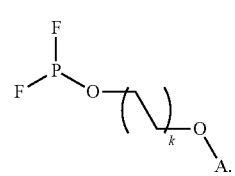

Chemical Formula 1A

In Chemical Formula 1A,

A may be a substituted or unsubstituted C1 to C30 alkyl group, and k may be an integer of 1 to 5.

In some embodiments, the compound represented by Chemical Formula 1A may be, for example, a compound represented by Chemical Formula A:

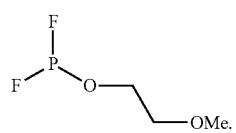

Compound A

In some embodiments, the compound represented by Chemical Formula 1 may be included in an amount of about 0.001 wt % to about 5 wt %, for example, about 0.01 wt % to about 5 wt %, about 0.1 wt % to about 5 wt %, or about 0.5 wt % to about 3 wt % based on a total amount of the electrolyte for a rechargeable lithium battery.

When the amount of the compound represented by Chemical Formula 1 is in the above ranges, a resistance increase at high temperatures may be prevented or reduced, and a rechargeable lithium battery having improved cycle-life characteristics may be realized.

For example, when the compound represented by Chemical Formula 1 is included in an amount of less than about 0.001 wt %, storage characteristics at high temperature and swelling improvement effects may be deteriorated, but when the compound represented by Chemical Formula 1 is included in an amount of greater than about 5 wt %, battery cycle-life may be deteriorated due to an increase in interface resistance.

In some embodiments, the additive according to an embodiment of the present disclosure may further include an additional additive (e.g., the electrolyte may include a second additive).

The additional additive may be, for example, at least one selected from vinylethylene carbonate (VEC), fluoroethylene carbonate (FEC), propene sultone (PST), propane sultone (PS), lithium tetrafluoroborate (LiBF$_4$), lithium bis(oxalato)borate (LiBOB), succinonitrile (SN), and combinations thereof, but embodiments of the present disclosure are not limited thereto.

The additional additive may be included in an amount of about 0.1 wt % to about 5 wt % and for example, in an amount of about 0.5 wt % to about 3 wt % based on a total amount of the electrolyte for a rechargeable lithium battery.

When the additional additive is included within the range, battery resistance may be effectively suppressed, and a rechargeable lithium battery having improved cycle-life characteristics may be realized.

The non-aqueous organic solvent may serve as a medium for transmitting ions taking part in the electrochemical reaction of a battery.

The non-aqueous organic solvent may be a carbonate-based, ester-based, ether-based, ketone-based, alcohol-based, and/or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, propylpropionate, decanolide, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. In addition, the ketone-based solvent may include cyclohexanone and/or the like. The alcohol-based solvent may include ethanol, isopropyl alcohol, and/or the like, and the aprotic solvent may include nitriles (such as R—CN, wherein R is a hydrocarbon group having a C2 to C20 linear, branched, or cyclic structure, and may include a double bond, an aromatic ring, or an ether bond), and/or the like, dioxolanes (such as 1,3-dioxolane and/or the like), sulfolanes, and/or the like.

The non-aqueous organic solvent may be used alone or in a mixture. When the organic solvent is used in a mixture, the mixture ratio may be controlled or selected in accordance with a desirable battery performance.

The carbonate-based solvent may be prepared by mixing a cyclic carbonate and a linear carbonate. When the cyclic carbonate and linear carbonate are mixed together in a volume ratio of about 1:1 to about 1:9, electrolyte performance may be improved.

The non-aqueous organic solvent may further include an aromatic hydrocarbon-based organic solvent in addition to the carbonate based solvent. Herein, the carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound represented by Chemical Formula 2:

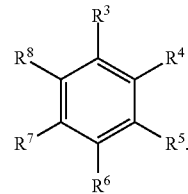

Chemical Formula 2

In Chemical Formula 2, $R^3$ to $R^8$ may each be the same or different, and may each independently be selected from hydrogen, a halogen atom, a C1 to C10 alkyl group, a haloalkyl group, and a combination thereof.

Non-limiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

In some embodiments, the electrolyte may further include vinylene carbonate or an ethylene carbonate-based compound represented by Chemical Formula 3 in order to improve the cycle-life of a battery:

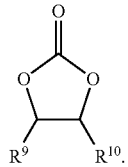

Chemical Formula 3

In Chemical Formula 3, $R^9$ and $R^{10}$ may be the same or different, and may each independently be selected from hydrogen, a halogen atom, a cyano group (CN), a nitro group (NO$_2$), and a fluorinated C1 to C5 alkyl group, provided that at least one of $R^9$ and $R^{10}$ is a halogen atom, a cyano group (CN), a nitro group (NO$_2$), and a fluorinated C1 to C5 alkyl group, and $R^9$ and $R^{10}$ are not simultaneously (e.g., both) hydrogen.

Non-limiting examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving cycle-life may be used within an appropriate or suitable range.

The lithium salt dissolved in the non-organic solvent supplies lithium ions in a battery, enables basic operation of the rechargeable lithium battery, and improves transportation of the lithium ions between positive and negative electrodes. Non-limiting examples of the lithium salt include at least one supporting salt selected from LiPF$_6$, LiBF$_4$, LiSbF$_6$, LiAsF$_6$, LiN(SO$_2$C$_2$F$_5$)$_2$, Li(CF$_3$SO$_2$)$_2$N, LiN ($SO_3C_2F_5$)$_2$, $LiC_4F_9SO_3$, $LiClO_4$, $LiAlO_2$, $LiAlCl_4$, LiN($C_xF_{2x+1}SO_2$)($C_yF_{2y+1}SO_2$) (wherein x and y are natural numbers, for example, an integer ranging from 1 to 20), LiCl, LiI, and LiB($C_2O_4$)$_2$ (lithium bis(oxalato) borate; LiBOB). The lithium salt may be used in a concentration ranging from about 0.1 M to about 2.0 M. When the lithium salt is included at the above concentration range, an electrolyte may have excellent performance and lithium ion mobility due to optimal or suitable electrolyte conductivity and/or viscosity.

A rechargeable lithium battery according to embodiments of the present disclosure includes a positive electrode; a negative electrode; and the electrolyte.

The positive electrode may include: a current collector, and a positive active material layer on the current collector and including a positive active material.

The positive active material may include lithiated intercalation compounds that reversibly intercalate and deintercalate lithium ions.

For example, one or more composite oxides including lithium and a metal (such as cobalt, manganese, nickel, and combinations thereof) may be used as a positive active material.

Non-limiting examples of the positive active material may be a compound represented by one of the following chemical formulae:

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $Li_aFePO_4$ (0.90≤a≤1.8).

In the above chemical formulae, A may be selected from nickel (Ni), cobalt (Co), manganese (Mn), and a combination thereof; X may be selected from aluminum (Al), Ni, Co, Mn, chromium (Cr), iron (Fe), magnesium (Mg), strontium (Sr), vanadium (V), a rare earth element, and a combination thereof; D may be selected from oxygen (O), fluoride (F), sulfur (S), phosphorus (P), and a combination thereof; E may be selected from Co, Mn, and a combination thereof; T may be selected from F, S, P, and a combination thereof; G may be selected from Al, Cr, Mn, Fe, Mg, lanthanum (La), cerium (Ce), Sr, V, and a combination thereof; Q may be selected from titanium (Ti), molybdenum (Mo), Mn, and a combination thereof; Z may be selected from Cr, V, Fe, scandium (Sc), yttrium (Y), and a combination thereof; and J may be selected from V, Cr, Mn, Co, Ni, copper (Cu), and a combination thereof.

The compounds may have (include) a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous, semi-crystalline, or crystalline. The coating element included in the coating layer may include Mg, Al, Co, potassium (K), sodium (Na), calcium (Ca), silicon (Si), Ti, V, tin (Sn), germanium (Ge), gallium (Ga), boron (B), astatine (As), zirconium (Zr), or a mixture thereof. The coating layer may be applied using any suitable method having no adverse influence on the properties of the positive active material. For example, the method may include any suitable coating method (e.g., spray coating, dipping, etc.), generally available in the related art.

Non-limiting examples of the positive active material according to embodiments of the present disclosure include lithium cobalt oxide ($LiCoO_2$).

In some embodiments, the positive active material may be included in an amount of about 90 wt % to about 98 wt % based on a total weight of the positive active material layer.

In some embodiments of the present disclosure, the positive active material layer may include a binder and a conductive material. Herein, the binder and the conductive material may be included (e.g., each be included) in an amount of about 1 wt % to about 5 wt %, respectively, based on a total amount of the positive active material layer.

The binder may improve the binding properties of the positive active material particles with one another and with a current collector. Non-limiting examples thereof include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but embodiments of the present disclosure are not limited thereto.

The conductive material may improve or provide electrode conductivity. Any electrically conductive material may be used as a conductive material unless it causes a chemical change (e.g., an unwanted chemical reaction). Non-limiting examples of the conductive material may include a carbon-based material (such as natural graphite, artificial graphite, carbon black, acetylene black, Ketjenblack, a carbon fiber, and/or the like); a metal-based material of a metal powder or a metal fiber (including copper, nickel, aluminum, silver, and/or the like); a conductive polymer (such as a polyphenylene derivative); and/or mixtures thereof.

The current collector may use or include Al, but embodiments of the present disclosure are not limited thereto.

The negative electrode may include: a current collector, and a negative active material layer formed on the current collector and including a negative active material.

The negative active material may include a material that reversibly intercalates/deintercalates lithium ions, a lithium metal, a lithium metal alloy, a material capable of doping/dedoping lithium, and/or transition metal oxide.

The material that reversibly intercalates/deintercalates lithium ions may include a carbon material. The carbon material may be any suitable carbon-based negative active material available in the art for a rechargeable lithium ion battery. Non-limiting examples thereof include crystalline carbon, amorphous carbon, and/or mixtures thereof. The crystalline carbon may be non-shaped (e.g., without a set or particular shape), and/or sheet, flake, spherical, and/or fiber shaped natural graphite and/or artificial graphite. The amorphous carbon may be a soft carbon, a hard carbon, a mesophase pitch carbonization product, fired coke, and/or the like.

The lithium metal alloy may include an alloy of lithium and a metal selected from Na, K, rubidium (Rb), Cs, francium (Fr), beryllium (Be), Mg, Ca, Sr, Si, antimony (Sb), lead (Pb), indium (In), zinc (Zn), barium (Ba), radium (Ra), Ge, Al, and Sn.

The material capable of doping/dedoping lithium may be Si, a Si—C composite, $SiO_x$ (0<x<2), a Si-Q alloy (wherein Q is an element selected from an alkali metal, an alkaline-earth metal, a Group 13 element, a Group 14 element excluding Si, a Group 15 element, a Group 16 element, a transition metal, a rare earth element, and combinations thereof), Sn, $SnO_2$, a Sn—R alloy (wherein R is an element selected from an alkali metal, an alkaline-earth metal, a Group 13 element, a Group 14 element excluding Sn, a Group 15 element, a Group 16 element, a transition metal, a rare earth element, and combinations thereof), and/or the like. At least one of these materials may be mixed with $SiO_2$. The elements Q and R may each independently be selected from Mg, Ca, Sr, Ba, Ra, Sc, Y, Ti, Zr, hafnium (Hf), rutherfordium (Rf), V, niobium (Nb), tantalum (Ta), dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, Ga, Sn, In, thallium (Tl), Ge, P, As, Sb, bismuth (Bi), S, selenium (Se), tellurium (Te), polonium (Po), and combinations thereof.

In some embodiments, the transition metal oxide may be vanadium oxide, lithium vanadium oxide, and/or lithium titanium oxide.

In the negative active material layer, the negative active material may be included in an amount of about 95 wt % to about 99 wt % based on a total weight of the negative active material layer.

In some embodiments of the present disclosure, the negative active material layer includes a binder, and optionally a conductive material. In the negative active material layer, a content of the binder may be about 1 wt % to about 5 wt % based on a total weight of the negative active material layer. When the negative active material layer includes a conductive material, the negative active material layer may include about 90 wt % to about 98 wt % of the negative active material, about 1 wt % to about 5 wt % of the binder, and about 1 wt % to about 5 wt % of the conductive material.

The binder may improve the binding properties of the negative active material particles with one another and with a current collector. The binder may include a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and combinations thereof.

The water-soluble binder may be a rubber-based binder and/or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and combinations thereof. The polymer resin binder may be selected from polytetrafluoroethylene, polyethylene, polypropylene, ethylene propylene copolymer, polyethylene oxide, polyvinylpyrrolidone, polyepichlorohydrin, polyphosphazene, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, and combinations thereof.

When the water-soluble binder is used as a negative electrode binder, a cellulose-based compound may be included to provide or increase viscosity. The cellulose-based compound may include one or more of carboxymethyl cellulose, hydroxypropylmethyl cellulose, methyl cellulose, and/or alkali metal salts thereof. The alkali metal may be Na, K, and/or Li. The cellulose-based compound (e.g., used as a thickener) may be included in an amount of about 0.1 to about 3 parts by weight based on 100 parts by weight of the negative active material.

The conductive material is included to provide or increase electrode conductivity. Any electrically conductive material may be used as a conductive material unless it causes a chemical change (e.g., unwanted chemical reaction). Non-limiting examples of the conductive material include a carbon-based material (such as natural graphite, artificial graphite, carbon black, acetylene black, Ketjenblack, a carbon fiber, and/or the like); a metal-based material of a metal powder and/or a metal fiber including copper, nickel, aluminum, silver, and/or the like; a conductive polymer (such as a polyphenylene derivative); and mixtures thereof.

The current collector may include one selected from a copper foil, a nickel foil, a stainless steel foil, a titanium foil, a nickel foam, a copper foam, a polymer substrate coated with a conductive metal, and combinations thereof.

The rechargeable lithium battery may further include a separator between the negative electrode and the positive electrode, depending on the type or format of the rechargeable lithium battery. Non-limiting examples of suitable separator materials include polyethylene, polypropylene, polyvinylidene fluoride, and multi-layers thereof (such as a polyethylene/polypropylene double-layered separator, a polyethylene/polypropylene/polyethylene triple-layered separator, and a polypropylene/polyethylene/polypropylene triple-layered separator).

FIG. 1 is a schematic view of a rechargeable lithium battery according to an embodiment of the present disclosure. The rechargeable lithium battery may be a cylindrical battery, as depicted in FIG. 1. However, embodiments of the present disclosure are not limited thereto, and features of the present disclosure may be suitably applied to additional types or formats of batteries (such as a prismatic type (prismatic battery), a pouch type (pouch battery), and/or the like).

Referring to FIG. 1, a rechargeable lithium battery 100 according to an embodiment of the present disclosure includes a battery cell including a negative electrode 112, a positive electrode 114 facing the negative electrode 112, a separator 113 interposed between the negative electrode 112 and the positive electrode 114, and an electrolyte for a rechargeable lithium battery impregnating the negative electrode 112, the positive electrode 114, and the separator 113, a battery case 120 housing the battery cell, and a sealing member 140 sealing the battery case 120.

Hereinafter, examples of the present disclosure and comparative examples are described. These examples, however, are not in any sense to be interpreted as limiting the scope of the disclosure.

Manufacture of Rechargeable Lithium Battery Cell

Example 1

A positive active material slurry was prepared using $LiCoO_2$ as a positive active material, polyvinylidene fluoride as a binder, and Ketjenblack as a conductive material in a weight ratio of 97.3:1.4:1.3 and dispersing the mixture in N-methyl pyrrolidone.

The positive active material slurry was coated on a 15 μm thick Al foil, dried at 100° C., and pressed to manufacture a positive electrode.

A negative active material slurry was prepared by mixing graphite as a negative active material, polyvinylidene fluoride as a binder, and Ketjenblack as a conductive material in a weight ratio of 98:1:1, and then dispersing the mixture in N-methyl pyrrolidone.

The negative active material slurry was coated on a 10 μm-thick Cu foil, dried at 100° C., and pressed to manufacture a negative electrode.

The positive and negative electrodes, a 25 μm thick polyethylene separator, and an electrolyte were used to manufacture a rechargeable lithium battery cell.

The electrolyte has the following composition:
Electrolyte Composition
  Salt: 1.5 M LiPF$_6$
  Solvent: ethylene carbonate:ethylmethyl carbonate:dimethyl carbonate (EC:EMC:DMC=volume ratio of 2:1:7)
  Additive: 1 wt % of the compound represented by Chemical Formula A:

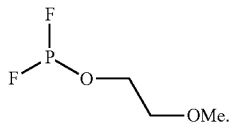

Chemical Formula A

Herein, in the electrolyte composition, "wt %" is based on a total amount of the electrolyte (lithium salt+non-aqueous organic solvent+additive)

Example 2

A rechargeable lithium battery cell was manufactured according to substantially the same method as Example 1, except that the electrolyte composition was changed as follows:
Electrolyte Composition
  Salt: 1.5 M LiPF$_6$
  Solvent: ethylene carbonate:ethylmethyl carbonate:dimethyl carbonate:fluoroethylene carbonate (EC:EMC:DMC: FEC=volume ratio of 15:10:59:16)
  Additive: 1 wt % of the compound represented by Chemical Formula A, 0.2 wt % of lithium tetrafluoroborate (LiBF$_4$), 1 wt % of lithium bis(oxalato)borate (LiBOB), and 1 wt % of succinonitrile (SN)

Example 3

A rechargeable lithium battery cell was manufactured according to substantially the same method as Example 2, except that the amount of the compound represented by Chemical Formula A was changed to 0.5 wt %.

Example 4

A rechargeable lithium battery cell was manufactured according to substantially the same method as Example 2, except that the amount of the compound represented by Chemical Formula A was changed to 3 wt %.

Comparative Example 1

A rechargeable lithium battery cell was manufactured according to substantially the same method as Example 1, except that the compound represented by Chemical Formula A was not used as the additive (e.g., the additive was not included).

Comparative Example 2

A rechargeable lithium battery cell was manufactured according to substantially the same method as Example 2, except that the compound represented by Chemical Formula A was not used as the additive (e.g., the additive was not included).

Battery Characteristics Evaluation
Evaluation 1: CV Characteristics Evaluation

Figure 2:
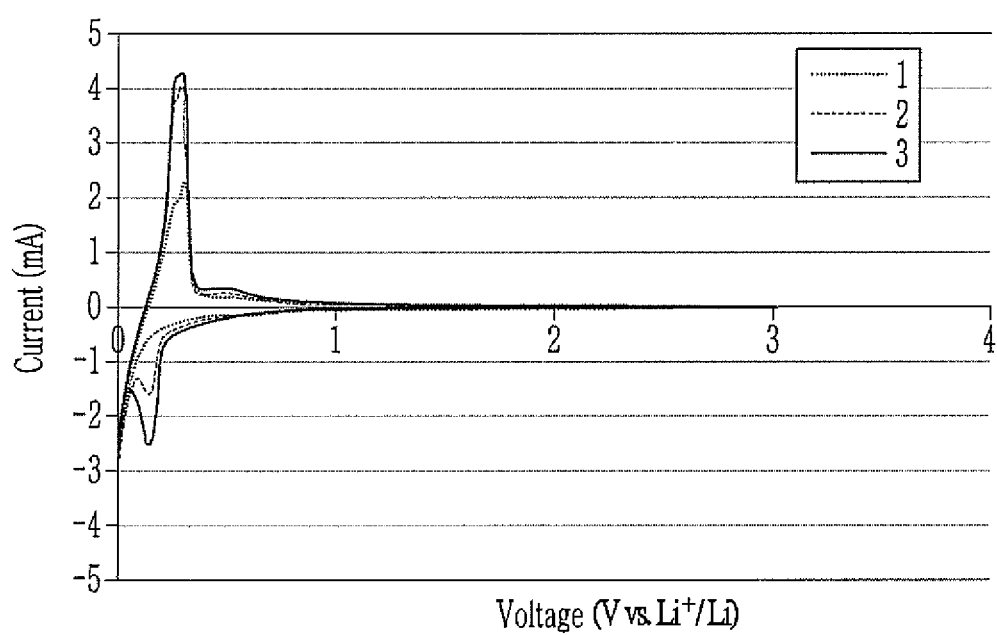
FIG. 2 is a plot showing multiple cyclic voltammetry (CV) scans of an electrolyte according to Comparative Example 1.
Figure 3:
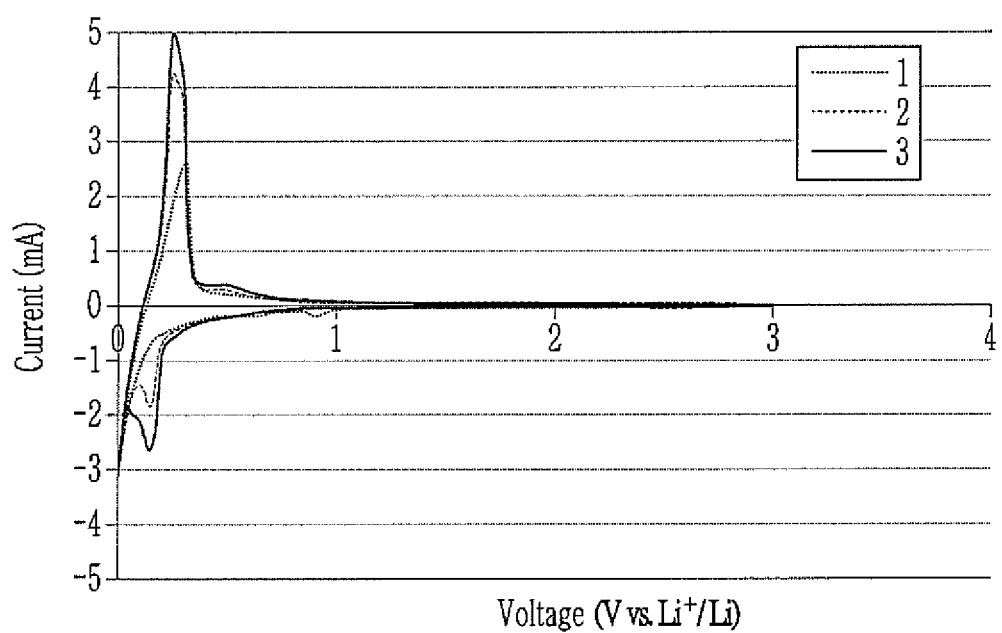
FIG. 3 is a plot showing multiple cyclic voltammetry (CV) scans of an electrolyte according to Example 1.
Figure 4:
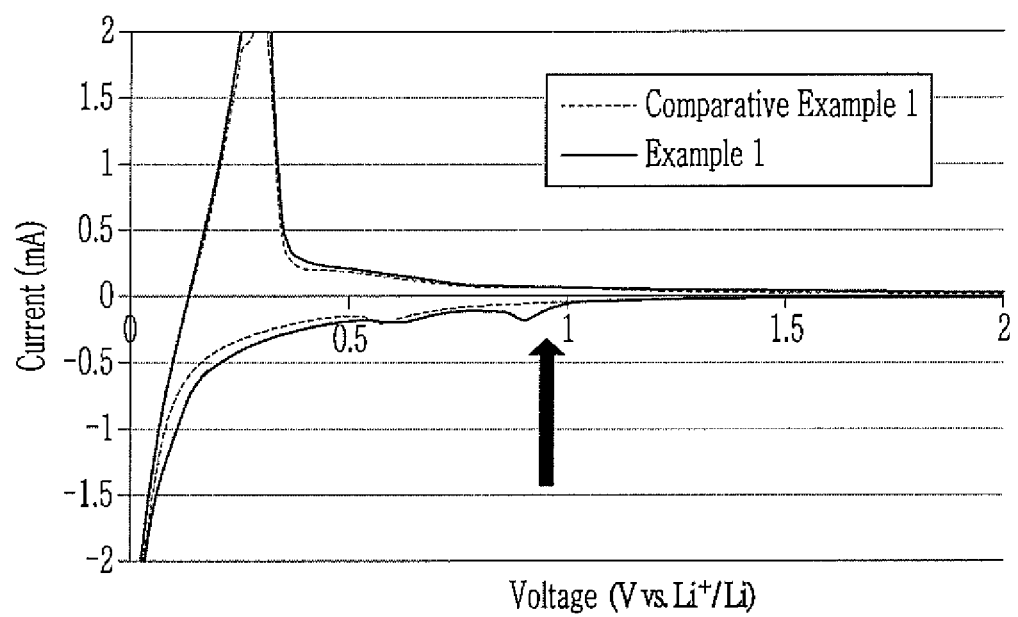
FIG. 4 is a plot showing multiple cyclic voltammetry (CV) scans of the electrolytes according to Example 1 and Comparative Example 1.

The electrochemical stabilities of the rechargeable lithium battery cells according to Example 1 and Comparative Example 1 were evaluated using cyclic voltammetry (CV), and the results are shown in FIGS. 2 to 4.

The cyclic voltammetry (CV) scans were measured using a three-electrode electrochemical cell using graphite as a working electrode, Li metal as a reference electrode, and Li metal as a counter electrode. Herein, 3 scans were each performed from 3 V to 0 V and from 0 V to 3 V at a scan rate of 0.1 mV/sec.

FIG. 2 is a plot showing multiple cyclic voltammetry (CV) scans of the electrolyte according to Comparative Example 1.

FIG. 3 is a plot showing multiple cyclic voltammetry (CV) scans of the electrolyte according to Example 1.

FIG. 4 is a plot comparing cyclic voltammetry (CV) scans of the electrolytes according to Example 1 and Comparative Example 1 at the initial cycle.

As shown in FIG. 2, the three-electrode cell of Comparative Example 1 showed a cycle-life deterioration phenomenon, as discharge capacity thereof continuously decreased with increasing cycles, and output resistance continuously increased, as a peak area reacting for the same time became smaller compared to the peaks in the CV of Example 1.

As shown in FIG. 3, the three-electrode cell of Example 1 exhibited sharper CV peaks each cycle compared with Comparative Example 1. This indicates that the three-electrode cell of Example 1 exhibited less resistance than Comparative Example 1.

In addition, the discharge capacity of the three-electrode cell of Example 1 was maintained throughout the cycles. Accordingly, the three-electrode cell according to Example 1 indirectly showed improvement of output and cycle-life characteristics compared with the three-electrode cell according to Comparative Example 1, which did not include the compound represented by Chemical Formula 1 as an additive.

Referring to FIG. 4, the three-electrode cell including the electrolyte according to Example 1 showed a CV reduction peak at about 0.8 V, while the three-electrode cell including the electrolyte according to Comparative Example 1 showed no CV reduction peak. Referring to these results, in the rechargeable lithium battery cell including the electrolyte according to Example 1, an initial SEI film may be expected to be formed. Accordingly, the rechargeable lithium battery cell according to Example 1 may be expected to have excellent battery performance compared with the rechargeable lithium battery cell according to Comparative Example 1 having no initial SEI film.

Evaluation 2: Linear Sweep Voltammetry (LSV) Evaluation of Battery Cells

Figure 5:
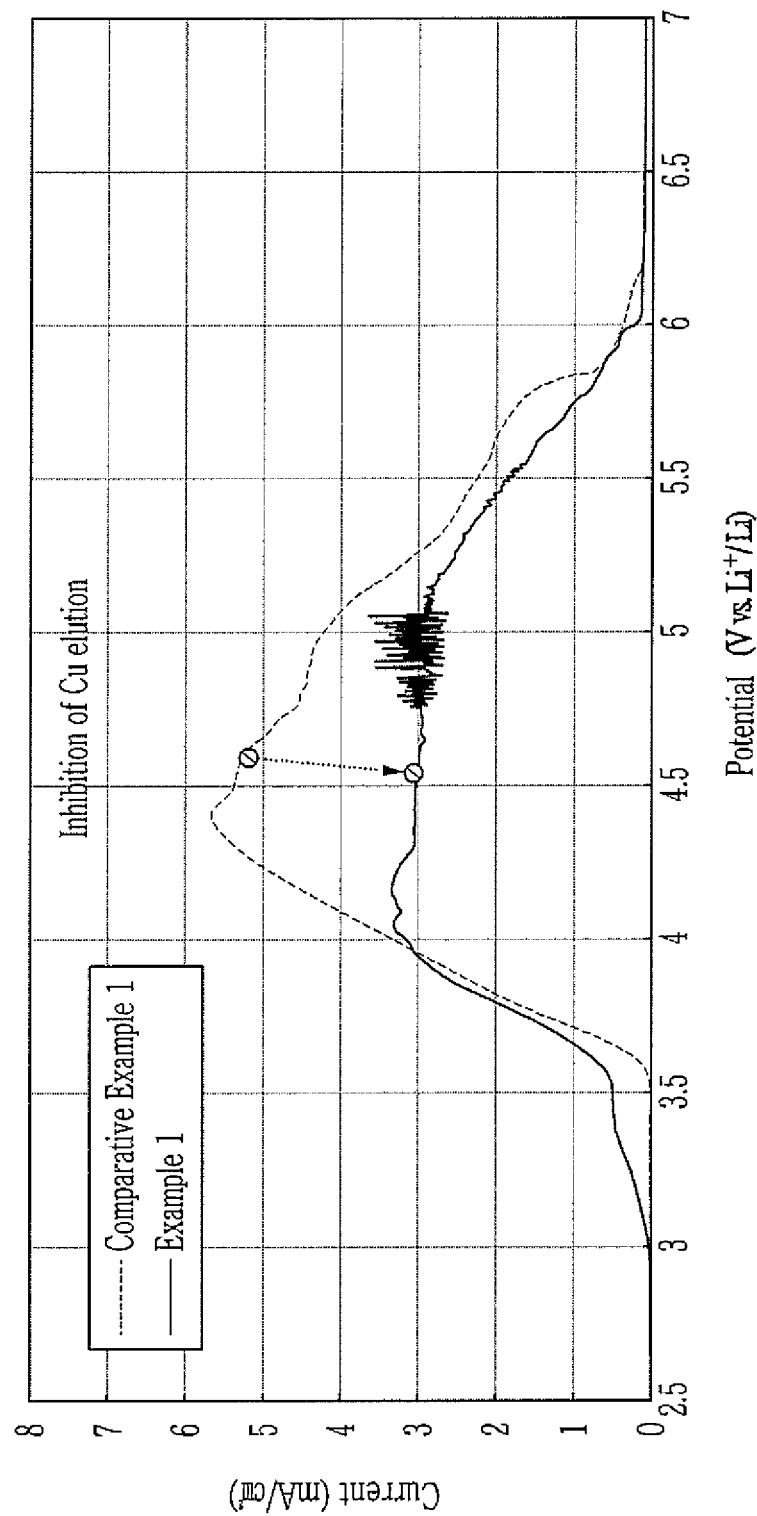
FIG. 5 is a plot showing linear sweep voltammetry (LSV) evaluation results of the electrolytes according to Example 1 and Comparative Example 1.

The oxidative decomposition of the electrolytes according to Example 1 and Comparative Example 1 was evaluated using linear sweep voltammetry (LSV) at 25° C., and the results are shown in FIG. 5.

A three-electrode electrochemical cell using a Cu electrode as a working electrode, Li metal as a reference electrode, and Li metal as a counter electrode was used. Herein, the sweep was performed at a scan rate of 1 mV/sec between a range of 2.5 V to 7.0 V.

FIG. 5 shows the LSV evaluation results of Example 1 and Comparative Example 1.

Referring to FIG. 5, the electrolyte of Example 1 including the compound represented by Chemical Formula A as an additive maintained a relatively low oxidation current over a considerably wide voltage section, compared with Comparative Example 1. As such, oxidative reactions of the electrolyte of Example 1 with a positive electrode were effectively suppressed or reduced over the considerably wide voltage section, and the electrolyte of Example 1 may thus be expected to have an excellent metal elution suppression effect at the positive electrode.

Evaluation 3: Evaluation of Battery Storage Characteristics at High Temperature

Figure 6:
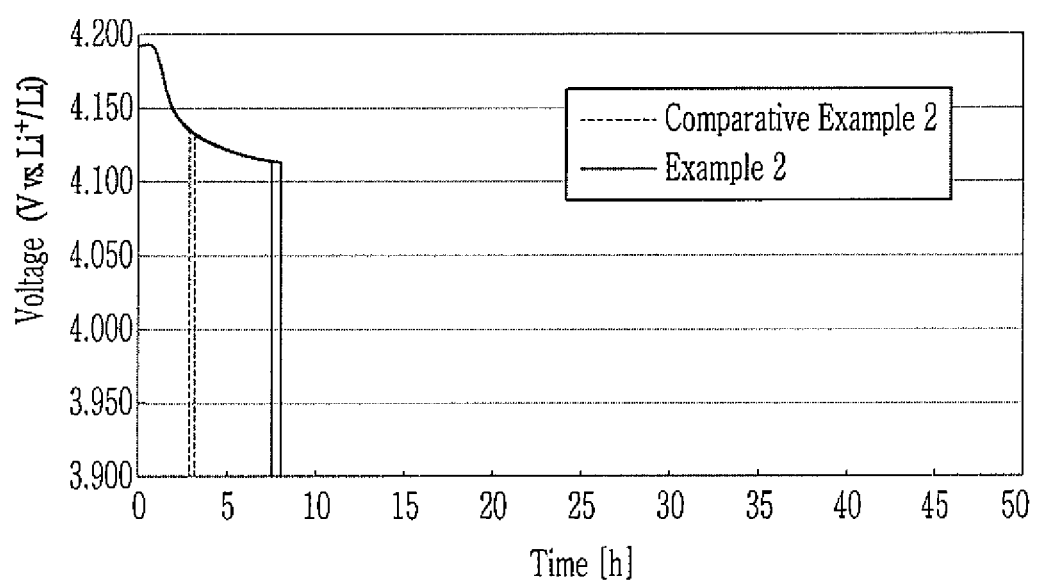
FIG. 6 is a plot showing Current Interrupt Device (CID) operation results for rechargeable lithium battery cells according to Example 2 and Comparative Example 2.

The storage characteristics of the rechargeable lithium battery cells of Example 2 and Comparative Example 2 at high temperature were evaluated by measuring their Current Interrupt Device (CID) open time, and the results are shown in Table 1 and FIG. 6.

The CID open times were measured by twice performing a formation charge/discharge at 0.2 C/0.5 C, followed by a charge/discharge experiment at 0.5 C/0.2 C with a charge cut-off voltage of 4.2 V (Li/graphite) and a discharge cut-off voltage of 3.0 V (Li/graphite), and then storing the cells in a 90° C. chamber for 60 hours.

FIG. 6 is a plot showing the CID (Current Interrupt Device) operation starting points of the rechargeable lithium battery cells according to Example 2 and Comparative Example 2.

TABLE 1

| | CID OPEN TIME (hr) (@ 90° C.) |
|---|---|
| Comparative Example 2 | 3.1 |
| Example 2 | 7.8 |

Referring to Table 1 and FIG. 6, the cell according to Comparative Example 2, which does not include the compound represented by Chemical Formula A as an additive, showed a sharp voltage drop before 5 hours when stored at a high temperature of 90° C., while the cell according to Example 2, which includes the compound represented by Chemical Formula A as an additive, had delayed electrolyte decomposition and a decreased resistance increase, and thus showed an delayed OCV drop effect. Accordingly, a rechargeable lithium battery cell according to embodiments of the present disclosure shows an excellent effect of suppressing gas generation, when stored at a high temperature.

Evaluation 4: DC-Internal Resistance (DC-IR)

The rechargeable lithium battery cells according to Examples 2 to 4 and Comparative Example 2 were set to have a residual capacity (a state of charge, SoC) of 100%, and then discharged at 1 C for 10 seconds, at 2 C for 10 seconds, at 3 C for 10 seconds, at 5 C for 10 seconds, after which their cut-off voltages were extrapolated to calculate a slope and thus obtain a DC-internal resistance (DC-IR).

After measuring the DC-internal resistance, the rechargeable lithium battery cells according to Examples 2 to 4 and Comparative Example 2 were stored at 60° C. for 10 days, after which their DC-internal resistances were measured again in the same method as aforementioned.

The DC-internal resistances of the cells were respectively twice measured, and their resistance increase rates after storage for 10 days are shown in Table 2.

Resistance increase rate=(DC-internal resistance after 10 days−Initial DC-internal resistance)/(Initial DC-internal resistance)*100

TABLE 2

| | | DC-IR (mOhm) | | Δ DC-IR (%) |
|---|---|---|---|---|
| | Cell Nos. | 0 D | 10 D | 0-10 D |
| Comparative Example 2 | 1 | 19.65 | 25.43 | 29.39 |
| Comparative Example 2 | 2 | 19.72 | 25.56 | 29.63 |
| Example 2 | 3 | 19.67 | 24.11 | 22.57 |
| Example 2 | 4 | 19.57 | 24.60 | 25.67 |
| Example 3 | 5 | 20.04 | 24.69 | 23.19 |
| Example 3 | 6 | 20.20 | 24.97 | 23.66 |
| Example 4 | 7 | 20.10 | 23.44 | 16.65 |
| Example 4 | 8 | 19.91 | 23.52 | 18.11 |

Referring to Table 2, Examples 2 to 4 showed smaller DC-internal resistance values and increase rates after being placed at 60° C. for 10 days, compared to Comparative Example 2. Accordingly, when the compound represented by Chemical Formula A was used as an additive, antioxidation at a high temperature and antiresistance of the battery cells in a charge state were improved.

As used herein, the terms "use", "using", and "used" may be considered synonymous with the terms "utilize", "utilizing", and "utilized", respectively. Further, the use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It will be understood that example embodiments described herein should be considered in a descriptive sense only, and not for purposes of limitation. Descriptions of features or aspects within each example embodiment should be considered as being available for other similar features or aspects in other example embodiments.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims and equivalents thereof.

DESCRIPTION OF SOME OF THE SYMBOLS

100: rechargeable lithium battery
112: negative electrode
113: separator
114: positive electrode
120: battery case
140: sealing member

What is claimed is:

1. An electrolyte for a rechargeable lithium battery, comprising:
a non-aqueous organic solvent, a lithium salt, and an additive,
wherein the additive comprises a compound represented by Chemical Formula 1:

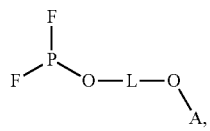

Chemical Formula 1 wherein, in Chemical Formula 1,
A is a substituted or unsubstituted C1 to C30 alkyl group, a substituted or unsubstituted C2 to C30 alkenyl group, a substituted or unsubstituted C2 to C30 alkynyl group, a substituted or unsubstituted C3 to C30 cycloalkyl group, a substituted or unsubstituted C3 to C30 cycloalkenyl group, a substituted or unsubstituted C3 to C30 cycloalkynyl group, or a substituted or unsubstituted C6 to C30 aryl group,
L is a substituted or unsubstituted C1 to C20 alkylene group, or $C_n(R^1)_{2n}$—O—$C_m(R^2)_{2m}$,
$R^1$ and $R^2$ are independently hydrogen, a substituted or unsubstituted C1 to C10 alkyl group, or a substituted or unsubstituted C3 to C10 cycloalkyl group, and
n and m are each independently an integer of 1 to 10.

2. The electrolyte for a rechargeable lithium battery of claim 1, wherein L of Chemical Formula 1 is a substituted or unsubstituted C2 to C20 alkylene group, or $C_n(R^1)_{2n}$—O—$C_m(R^2)_{2m}$,
$R^1$ and $R^2$ are each independently hydrogen, a substituted or unsubstituted C1 to C10 alkyl group, or a substituted or unsubstituted C3 to C10 cycloalkyl group, and
n and m are each independently an integer of 2 to 10.

3. The electrolyte for a rechargeable lithium battery of claim 1, wherein the compound represented by Chemical Formula 1 is further represented by Chemical Formula 1A:

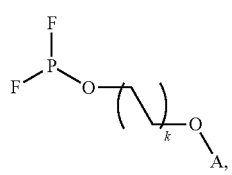

Chemical Formula 1A wherein, in Chemical Formula 1A,
A is a substituted or unsubstituted C1 to C30 alkyl group, and
k is an integer of 1 to 5.

4. The electrolyte for a rechargeable lithium battery of claim 3, wherein the compound represented by Chemical Formula 1A is further represented by Chemical Formula A:

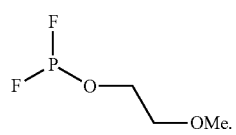

Chemical Formula A

5. The electrolyte for a rechargeable lithium battery of claim 1, wherein the compound represented by Chemical Formula 1 is included in an amount of about 0.001 wt % to about 5 wt % based on a total amount of the electrolyte for a rechargeable lithium battery.

6. The electrolyte for a rechargeable lithium battery of claim 1, wherein the additive further comprises at least one additional additive selected from vinylethylene carbonate (VEC), fluoroethylene carbonate (FEC), propene sultone (PST), propane sultone (PS), lithium tetrafluoroborate ($LiBF_4$), lithium bis(oxalato)borate (LiBOB), succinonitrile (SN), and combinations thereof.

7. The electrolyte for a rechargeable lithium battery of claim 6, wherein the additional additive is included in an amount of about 0.1 wt % to about 5 wt % based on a total amount of the electrolyte for a rechargeable lithium battery.

8. A rechargeable lithium battery, comprising:
a positive electrode;
a negative electrode; and
the electrolyte of claim 1 between the positive electrode and the negative electrode.

9. The rechargeable lithium battery of claim 8, further comprising:
a solid electrolyte interphase (SEI) film on a surface of the negative electrode between the negative electrode and the electrolyte,
wherein the SEI film comprises the compound represented by Chemical Formula 1.

10. The rechargeable lithium battery of claim 9, wherein the SEI film further comprises an oxide of the compound represented by Chemical Formula 1.

11. The rechargeable lithium battery of claim 8, wherein the compound represented by Chemical Formula 1 is decomposed into a difluorophosphite group (—$OPF_2$) and an oxide, and the difluorophosphite group is bound to a surface of the positive electrode.

12. The rechargeable lithium battery of claim 8, wherein L of Chemical Formula 1 is a substituted or unsubstituted C2 to C20 alkylene group, or $C_n(R^1)_{2n}$—O—$C_m(R^2)_{2m}$,
$R^1$ and $R^2$ are each independently hydrogen, a substituted or unsubstituted C1 to C10 alkyl group, or a substituted or unsubstituted C3 to C10 cycloalkyl group, and
n and m are each independently an integer of 2 to 10.

13. The rechargeable lithium battery of claim 8, wherein the compound represented by Chemical Formula 1 is further represented by Chemical Formula 1A:

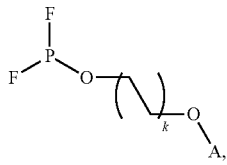

Chemical Formula 1A wherein, in Chemical Formula 1A,

A is a substituted or unsubstituted C1 to C30 alkyl group, and k is an integer of 1 to 5.

14. The rechargeable lithium battery of claim 13, wherein the compound represented by Chemical Formula 1A is further represented by Chemical Formula A:

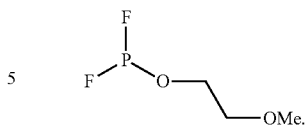

Chemical Formula A

15. The rechargeable lithium battery of claim 8, wherein the compound represented by Chemical Formula 1 is included in an amount of about 0.001 wt % to about 5 wt % based on a total amount of the electrolyte for a rechargeable lithium battery.

16. The rechargeable lithium battery of claim 8, wherein the additive further comprises at least one additional additive selected from vinylethylene carbonate (VEC), fluoroethylene carbonate (FEC), propene sultone (PST), propane sultone (PS), lithium tetrafluoroborate (LiBF$_4$), lithium bis(oxalato)borate (LiBOB), succinonitrile (SN), and combinations thereof.

17. The rechargeable lithium battery of claim 16, wherein the additional additive is included in an amount of about 0.1 wt % to about 5 wt % based on a total amount of the electrolyte for a rechargeable lithium battery.

* * * * *